United States Patent
Hagström et al.

(12)

(10) Patent No.: US 10,219,652 B2
(45) Date of Patent: Mar. 5, 2019

(54) PORTABLE STOVE

(71) Applicant: Fenix Outdoor Development and CSR AG, Baar (CH)

(72) Inventors: Magnus Hagström, Tyresö (SE); Erland Brännholm, Stockholm (SE); Niklas Liljedahl, Stockholm (SE); Eric Svartström, Drottningholm (SE)

(73) Assignee: FENIX OUTDOOR DEVELOPMENT AND CSR AG, Zug (CH)

( * ) Notice: Subject to any disclaimer, the term of this patent is extended or adjusted under 35 U.S.C. 154(b) by 265 days.

(21) Appl. No.: 14/703,765

(22) Filed: May 4, 2015

(65) Prior Publication Data

US 2015/0313409 A1 Nov. 5, 2015

(30) Foreign Application Priority Data

May 5, 2014 (EP) ..................................... 14166975

(51) Int. Cl.
  *F24C 3/14* (2006.01)
  *A47J 37/06* (2006.01)
  *A47J 37/07* (2006.01)

(52) U.S. Cl.
  CPC ........ *A47J 37/0763* (2013.01); *A47J 37/0647* (2013.01); *A47J 37/0713* (2013.01); *F24C 3/14* (2013.01)

(58) Field of Classification Search
  CPC .............. A47J 37/0647; A47J 37/0713; A47J 37/0763; F24C 3/14
  See application file for complete search history.

(56) References Cited

U.S. PATENT DOCUMENTS

| 3,289,731 A | * | 12/1966 | Geber | ..................... F23D 14/06 |
| | | | | 126/39 R |
| 3,703,166 A | * | 11/1972 | White, Jr. | ................. F24C 5/16 |
| | | | | 126/44 |
| 3,829,278 A | * | 8/1974 | Penberthy | ............... F23C 99/00 |
| | | | | 431/227 |

(Continued)

OTHER PUBLICATIONS

EP14166975.4 Extended European Search Report dated Apr. 14, 2015.

(Continued)

*Primary Examiner* — Kenneth Rinehart
*Assistant Examiner* — Deepak A Deean
(74) *Attorney, Agent, or Firm* — Jeffer Mangels Butler & Mitchell LLP; Brennan C. Swain, Esq.

(57) ABSTRACT

The present invention relates to a portable stove for burning multiple fuels comprising. The portable stove includes a burner body having a burner head, an exchangeable jet screwable into the burner head, a plurality of legs attached to the burner body, and a flame spreader detachably mounted on top of the burner head upstream the jet in the flame direction. The present invention is characterized in that the portable stove includes at least a second exchangeable jet screwable into the burner head, and the portable stove includes at least one mounting structure, wherein the second jet is supported within said mounting structure. The present invention is further characterized in that the flame spreader is attached to the portable stove with an elastic element.

9 Claims, 8 Drawing Sheets

(56) References Cited

U.S. PATENT DOCUMENTS

| | | | | |
|---|---|---|---|---|
| 4,092,974 A * | 6/1978 | Zenzaburo | F24C 3/14 | 126/38 |
| 4,105,013 A * | 8/1978 | Vache | A47J 36/26 | 126/38 |
| 4,177,790 A * | 12/1979 | Zenzaburo | F24C 3/14 | 126/38 |
| 4,604,049 A * | 8/1986 | Katchka | F23D 14/725 | 431/350 |
| 5,613,485 A * | 3/1997 | Covault | F24C 3/14 | 126/24 |
| 5,803,727 A * | 9/1998 | Long | F23D 11/443 | 126/38 |
| 5,868,126 A * | 2/1999 | Long | F24C 3/14 | 126/25 R |
| 5,954,044 A * | 9/1999 | Schmidt | F24C 3/14 | 126/25 R |
| D416,750 S * | 11/1999 | Persson | D7/337 | |
| 5,979,428 A * | 11/1999 | Greene, Jr. | F24C 15/28 | 126/38 |
| 6,173,709 B1 * | 1/2001 | Yokoyama | F23D 14/06 | 126/39 E |
| 6,182,651 B1 * | 2/2001 | Tornsten | F23D 11/443 | 126/38 |
| 6,213,760 B1 * | 4/2001 | Yokoyama | F24C 3/14 | 431/247 |
| 6,237,891 B1 * | 5/2001 | Stiner | F23D 14/28 | 138/44 |
| D446,991 S * | 8/2001 | Taniguchi | D7/337 | |
| 7,137,810 B2 * | 11/2006 | Tschop | F23Q 3/002 | 126/25 B |
| 7,168,426 B1 * | 1/2007 | Hsu | A47J 36/26 | 126/256 |
| D542,908 S * | 5/2007 | Tschop | D23/402 | |
| 7,553,264 B2 * | 6/2009 | Carter | A63B 21/154 | 482/102 |
| D610,390 S * | 2/2010 | Nishijima | D7/332 | |
| 7,775,203 B1 * | 8/2010 | Patrick | F24C 3/14 | 126/38 |
| 7,896,266 B1 * | 3/2011 | Cooper | B05B 9/007 | 134/172 |
| D683,999 S * | 6/2013 | Karlsson | D7/337 | |
| 8,459,247 B1 * | 6/2013 | Bourgeois | F24C 3/12 | 126/25 R |
| 8,650,731 B2 * | 2/2014 | Ko | B21J 15/043 | 29/243.521 |
| 8,695,582 B1 * | 4/2014 | Lin | F24C 3/14 | 126/30 |
| 8,776,338 B2 * | 7/2014 | Yuan | B21J 15/386 | 29/243.521 |
| 9,383,111 B2 * | 7/2016 | Nelson, Sr. | F24C 3/14 | |
| 9,429,327 B2 * | 8/2016 | Kim | F23D 14/28 | |
| 9,795,251 B2 * | 10/2017 | Rosecrans | A47J 37/0786 | |
| 2004/0200436 A1 * | 10/2004 | Staack | A01K 1/04 | 119/792 |
| 2007/0006868 A1 * | 1/2007 | Svedlund | F24C 1/16 | 126/39 N |
| 2008/0029082 A1 * | 2/2008 | Dowst | A47J 27/022 | 126/9 B |
| 2008/0184981 A1 * | 8/2008 | Su | F24C 3/14 | 126/40 |
| 2009/0280447 A1 * | 11/2009 | Long | F24C 3/085 | 431/123 |
| 2015/0313409 A1 * | 11/2015 | Hagstrom | A47J 37/0647 | 126/25 R |

OTHER PUBLICATIONS

Outdoorblog Schweiz—Mehrstoff-Kocher OmniLite Ti von Primus im Test, web page downloaded Dec. 1, 2015; with English translation.

WhisperLite Universal Stove Instruction Manual.

* cited by examiner

- Prior Art -

- Prior Art -

PORTABLE STOVE

FIELD OF THE INVENTION

The present invention relates to a portable stove. In particular, the present invention relates to a portable stove for burning multiple fuels.

BACKGROUND OF THE INVENTION

Commonly, such portable stoves comprise a burner body having a burner head, an exchangeable jet screwable into the burner head, a plurality of legs attached to the burner body, and a flame spreader detachably mounted on top of the burner head upstream the jet in the flame direction. When lighted, the flame emerges from the jet and hits the flame spreader where the flame is laterally distributed to obtain a planar heating of the cookware placed on top of the burner head. The legs are intended to have the portable stove stably resting on a surface or ground floor and can for instance be plugged to the burner body or be pivotally mounted to the burner body.

A portable stove as describe above is available as Primus® OmniFuel Stove. Said stove can be used with a plurality of different combustibles including gaseous combustibles like propane, butane or a mixture thereof, white gas, or liquid combustibles like vehicle petrol, kerosene or diesel oil. Hence, the stove can be used with nearly all combustible available worldwide. A schematic perspective view of the Primus® OmniFuel Stove is shown in FIG. 1 with the portable stove being connected to a gas cartridge storing a gaseous combustible (FIG. 1a) and being connected to a fuel bottle storing liquid combustible (cf. FIG. 1b).

To ensure optimal flame patterns and a clean combustion, the jet mounted to the burner head has to be chosen to suit the combustible used. For instance, in case liquid fuel is used, a jet having a smaller size is to be mounted to the burner head compared to the jet to be used when a gaseous combustible is burned.

To exchange the jet, the flame spreader is detached from the burner head, and the jet currently mounted to the burner head is unscrewed. Afterwards the new jet is screwed to the burner head and the flame spreader is again mounted. For mounting and demounting the flame spreader, the latter one is provided with three mounting arms having catch mechanisms at the ends which engage the upper rim of the burner head. However, for mounting and demounting the flame spreader a lot of force is required. In addition, the catch mechanisms may be worn if mounted and demounted many a time. Thus, the flame spread might no longer be stably fitted to the stove or might even get lost during travelling.

Furthermore, in case the user is travelling for a long time and is not sure about the combustibles available in remote locations, several jets are to be taken with oneself. The jets are to be stored somewhere, e.g. in a storage container like a bag or a box or the like. However, in case the storage container is lost, only the jet currently screwed to the burner head is available. This might be crucial as using a non-suitable jet with the respective combustible may lead to sooting of the burner head rendering the portable stove unusable. In addition, a non-suitable jet does no longer ensure a clean combustion and hence, harmful compounds or gases may be formed, e.g. carbon monoxide.

Hence, the above outlined disadvantages might lead to inconvenient or even dangerous situations in case the portable stove cannot be used any longer due to a lost jet or a lost flame spreader or when the portable stove is used with a jet incompatible to the used combustible.

SUMMARY OF THE PREFERRED EMBODIMENTS

Accordingly, it is the technical objective of the present invention to provide a portable stove preventing the risk of losing essential parts of the portable stove.

The problem is solved with a portable stove according to claim 1 or claim 5. Preferred embodiments of the present invention are disclosed and described in claims 2 to 4 and 6 to 15.

The inventive portable stove as described in claim 1 is characterized in that the portable stove comprises at least a second exchangeable jet screwable into the burner head, and the portable stove further comprises at least one mounting structure, wherein the second jet is supported within said mounting structure. In other words, there is a structure suitable to receive a further jet and thus, the non-used jet can be stored together with the portable stove. As a matter of course, there can be more than one mounting structure provided with the portable stove. Thus, the non-used jets are no longer stored in a separate storage container, but are directly fitted to the portable stove. Hence, the jets cannot be lost.

According to an aspect of the invention, the mounting structure is disposed on one of said legs. Of course, the mounting structure can be provided on one leg or on any number of legs depending on the amount of jets to be carried together with the portable stove.

According to another aspect of the present invention, the mounting structure is an opening having an inside thread, wherein the second jet is screwed into the opening. The external thread provided on the jet for screwing it into the burner head further allows the jet to be screwed into the opening such that the jet is secured to the portable stove. The mounting structure may also be provided as a structure having an external threading in case the jets are provided with an internal threading.

According to a further aspect of the present invention which is also described in claim 5, the flame spreader is attached to the portable stove with an elastic element. Thus, in case the flame spreader is demounted from the burner head, it cannot be lost as it is further attached to the portable stove. In addition, the elastic element provides a force sufficiently high to securely fix the flame spreader to the burner head. This in turn facilitates the mounting and demounting of the flame spreader, and further prevents wearing of the flame spreader.

According to a further aspect of the present invention, the flame spreader comprises a baffle plate and at least two mounting arms extending from the baffle plate. A first mounting arm is attachable to the burner head by a form-fit, and wherein a second mounting arm is attached to a first end of the elastic element. Thus, the flame spreader is attached to the burner head in that the form fit is established by catching the burner head with the respective catch mechanism provided at the end of the first mounting arm, wherein the force generated by the elastic element secures the flame spreader on the burner head. This arrangement greatly facilitates the mounting and demounting procedure of the flame spreader and further inhibits wearing as the mounting arms do not need to be elastically deformed for mounting and demounting the burner head. Of course, the flame spreader may comprise more than two mounting arms with at least two mounting arms being attachable to the burner head by a form-fit.

According to another aspect of the present invention, a second end of the elastic element is attached to the burner body. This allows the flame spreader to be easily mounted to and demounted from the burner head. In addition, the elastic element can be easily accessed and replaced if necessary.

According to another aspect of the present invention, the burner body comprises a wind shield surrounding the burner head, wherein the second end of the elastic element is attached to the wind shield. The wind shield ameliorates the flame pattern and inhibits a distorted heat transfer caused by wind.

According to another aspect of the present invention, the wind shield comprises a clearance on its upper end, wherein the second mounting arm is rests in the clearance when the flame spreader is mounted to the burner head. This facilitates the mounting of the flame spreader as only one possibility of mounting the flame spreader is possible. In addition, the second mounting arm cannot be laterally displaced which in turn inhibits the unintended separation of the flame spreader and the burner head.

According to another aspect of the present invention, the elastic element is an elastic tension element, preferably a helical tension spring. Helical tension springs are commonly available and thus, are inexpensive and can easily be replaced if out of function.

According to another aspect of the present invention, one of said jets is suitable for gaseous combustibles and wherein one of said jets is suitable for liquid combustibles. Thus, the portable stove can be used e.g. to prepare food or heat up water independently from the combustible available. This allows the portable stove to be used under a wide range of conditions.

According to another aspect of the present invention, the portable stove further comprises a multitool for screwing and unscrewing the jets into the burner head. Thus, the jets can be screwed to the burner head with a sufficient load. A sufficient load is mandatory to allow the portable stove to be operated adequately. In addition, it is preferable that the multitool can be secured to the portable stove when the portable stove is stored and not in use.

A specific embodiment of the invention will now be described below, by way of example, with reference to the accompanying drawings.

DETAILED DESCRIPTION OF THE PREFERRED EMBODIMENTS

Figure 1A:
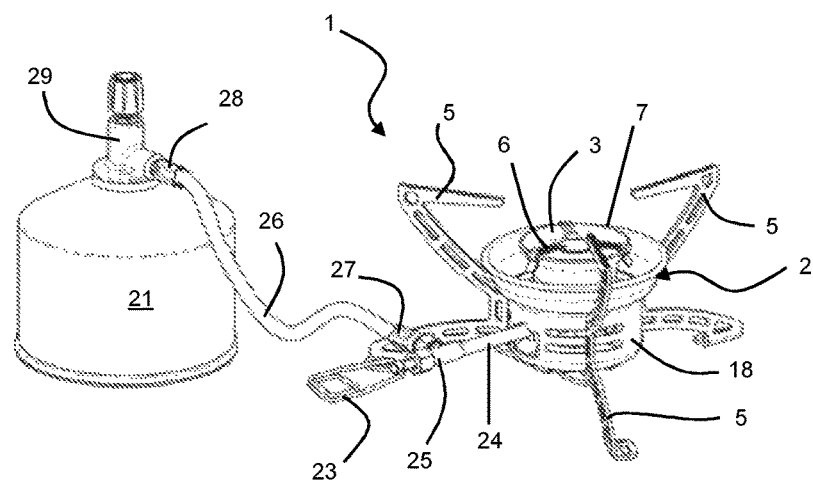
FIG. 1a is a perspective view of a prior art portable stove.

As can be seen from the Figures, the portable stove 1 is a multifuel portable stove 1. Hence, it can be used with a variety of different combustibles. The portable stove 1 comprises a burner body 2 having a burner head 3 disposed within the burner body 2. A jet 4 is screwed into the burner head 3 and a plurality of legs 5 are attached to the burner body 2. In the embodiment shown, three legs 5 are attached to the burner body 2 in a hinged manner. A flame spreader 6 is mounted on top of the burner head 3 upstream of the jet 4 in the flame direction FD.

Figure 1B:
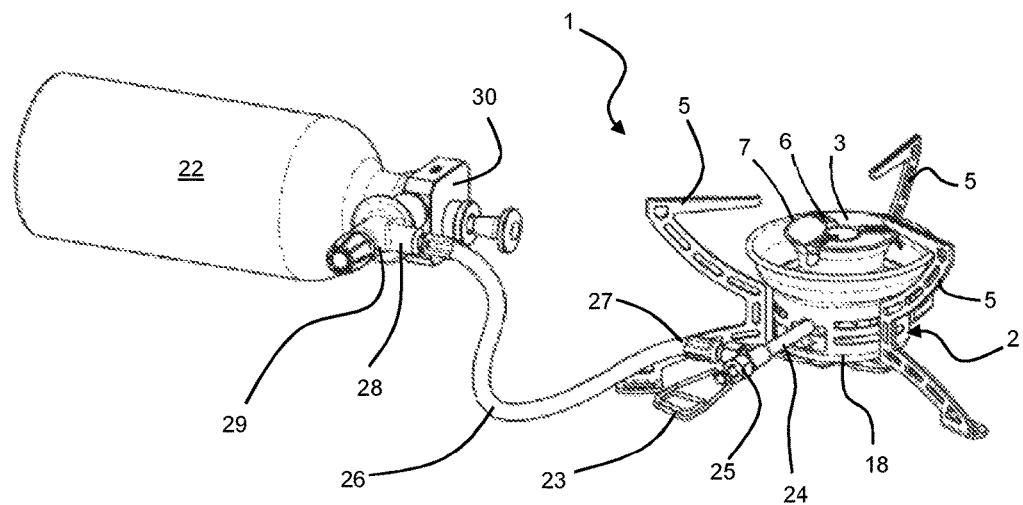
FIG. 1b is a perspective view of a prior art portable stove.
Figure 2:
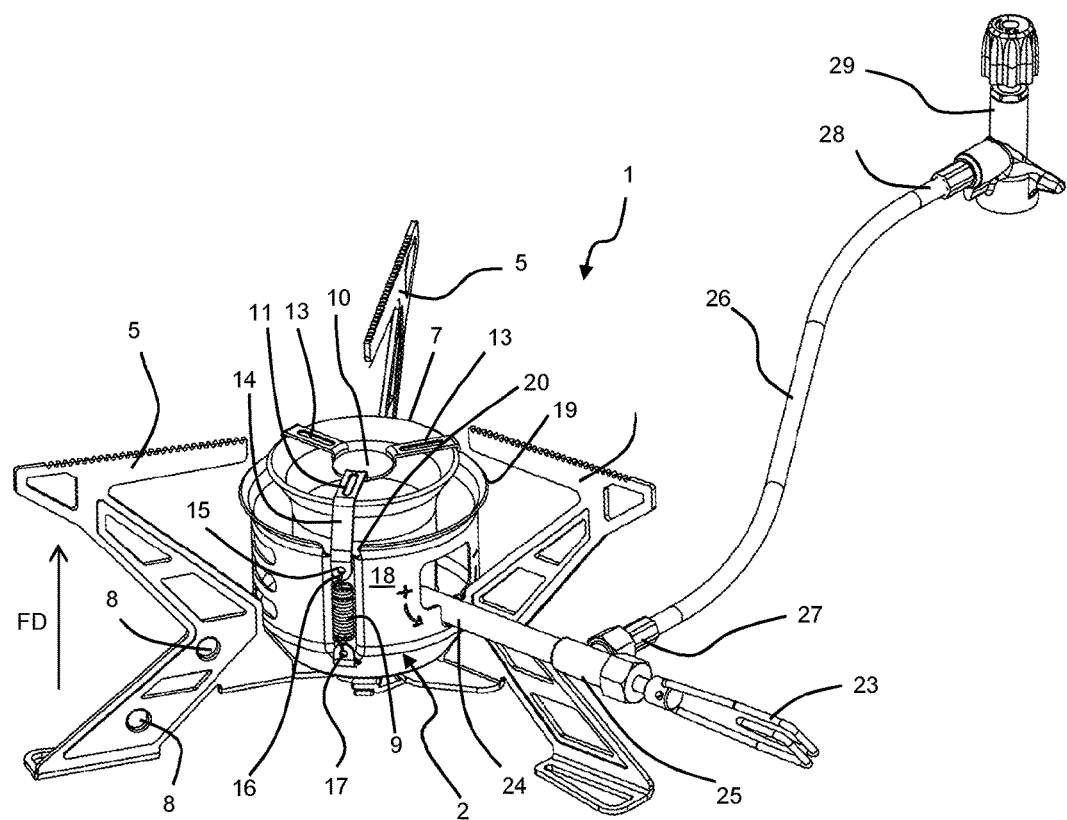
FIG. 2 is a perspective view of the portable stove with mounted flame spreader.
Figure 3:
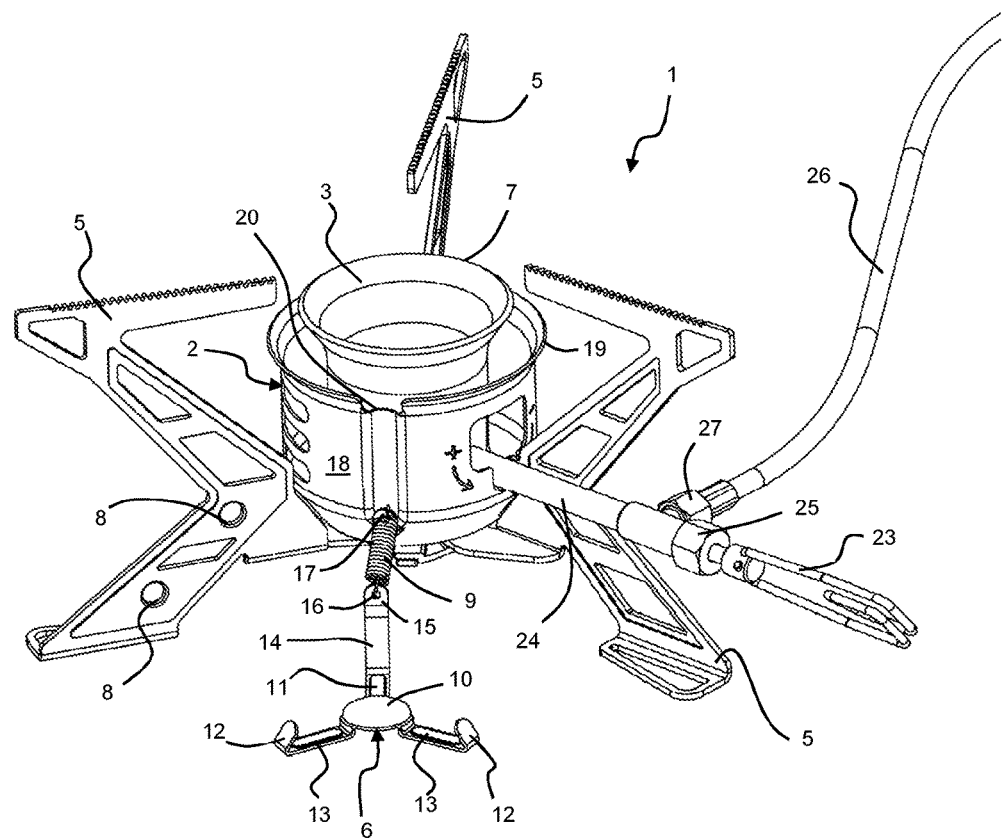
FIG. 3 is a perspective view of the portable stove with demounted flame spreader.
Figure 4:
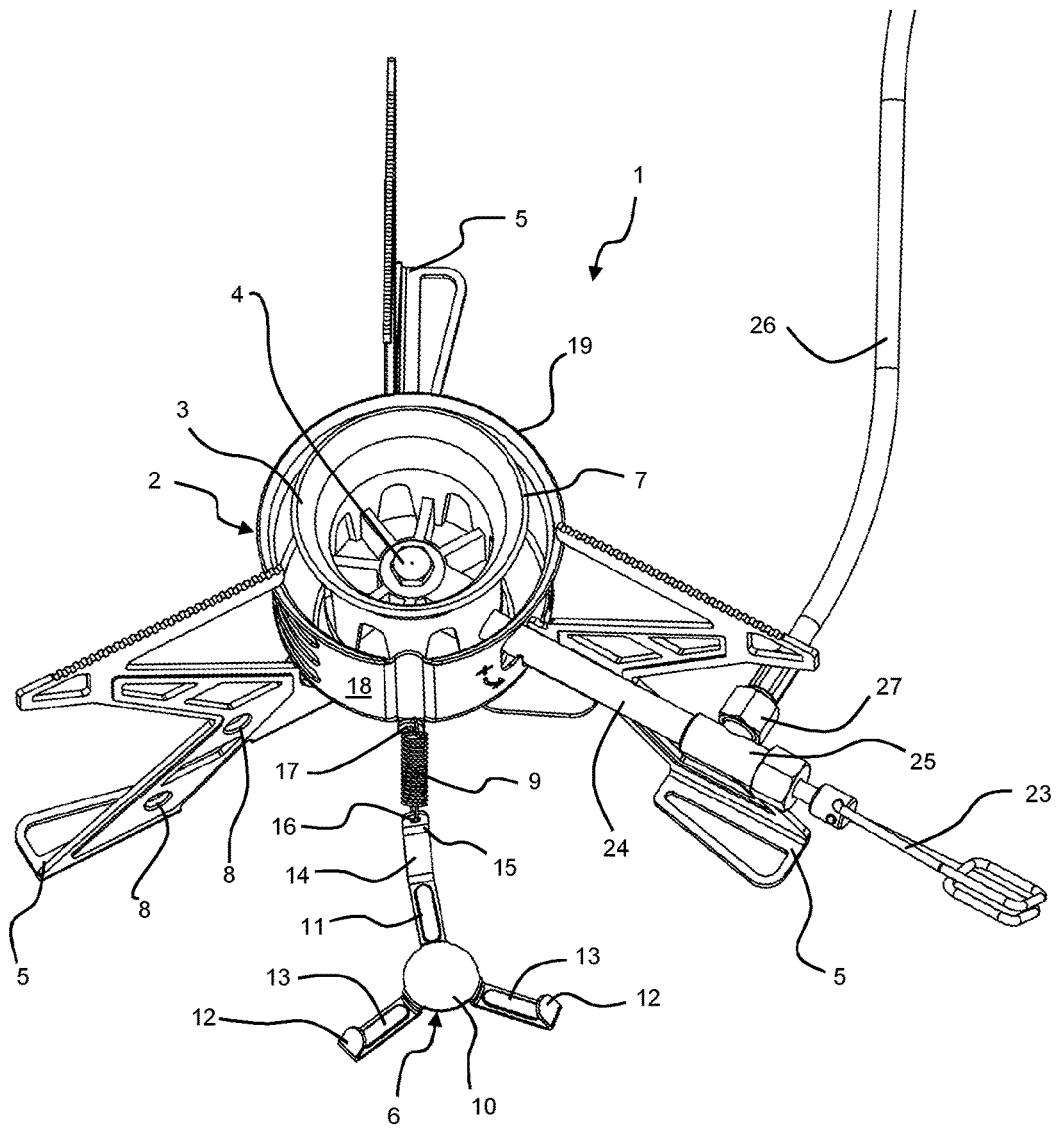
FIG. 4 is a top view of the portable stove with demounted flame spreader.

As can be seen from FIGS. 2 to 4, the portable stove 1 further comprises a wind shield 18 surrounding the burner head 3 and a gas control 23 mounted within an inlet tube 24 for regulation of the combustible flow. The inlet tube 24 comprises a connection valve 25 and further opens out into the burner head 3. A first end 27 of a hose 26 is attached to the connection valve 25 and a second end 28 of the hose 26 is connected to a shut-off valve 29 which can either be directly mounted to a cartridge 21 containing gaseous combustible (as shown in FIG. 1a for a prior art stove) or to a pumping device 30, the latter one being connected to a fuel bottle 22 containing liquid combustible (as shown in. FIG. 1b for a prior art stove).

The flame spreader 6 comprises a baffle plate 10 and three mounting arms 11, 13 extending from the baffle plate 10 in the radial direction. Two of the mounting arms 13 are provided with catch mechanisms 12 at its ends which can be engaged to an upper rim portion 7 of the burner head 3, as can be seen from e.g. FIG. 3. One mounting arm 11 is provided with a substantially perpendicular extending arm portion 14 at its end. When mounted to the burner head 3, the arm portion 14 extends virtually parallel to the burner head 3 and has a mounting section 15 at its end. In the embodiment shown, the elastic element 9 is composed of a helical tension spring 9 which is mounted to the mounting section 15 with its first spring end 16. The second spring end 17 is attached to the burner body 2, in the embodiment shown to the wind shield 18. As can further be taken from FIG. 3, the wind shield 18 is provided with a clearance 20 at its upper end rim portion 19 and the mounting arm 11 with the arm portion 14 is resting within the clearance 20 when the flame spreader 6 is mounted to the burner head 3 (cf. FIG. 2).

To mount the flame spreader 6, the flame spreader 6 is manually moved over the burner head 3, therewith stretching the helical tension spring 9 such that a force is generated. Then, the two mounting arms 13 with the catch mechanisms 12 are attached to the burner head 3 such that a form-fit is established between the catch mechanisms 12 and the upper rim 7 of the burner head 3. Next, the flame spreader 6 is lowered until the mounting arms 13 are supported on the upper rim 7 of the burner head 3. As the helical tension spring 9 is not stress-free, but still expanded to some degree, the flame spreader 6 is pressed onto the burner head 3 and cannot separate therefrom. Unintended separation of the flame spreader 6 and the burner head 3 is further hindered as the mounting arm 11 with the arm portion 14 rests within the clearance 20 and lateral displacement thereof is inhibited.

To demount the flame spreader 6, the above described procedure is reversed, i.e. the flame spreader 6 is manually lifted from the burner head 3 against the spring force and the catch mechanisms 12 are then disengaged from the upper rim 7 of the burner head 3. As the helical tension spring 9 is permanently attached to the wind shield 18 with its second spring end 17 and to the flame spreader 6 with its first spring end 16, the flame spreader 6 cannot get lost when demounted.

When the flame spreader 6 is demounted, the jet 4 screwed into the burner head 3 can be removed or exchanged respectively. Therefore, the portable stove 1 comprises a multitool 31 which can be brought into engagement with the mounted jet 4. By turning the multitool 31, the jet 4 is unscrewed from the burner head 3 and can be removed.

Figure 5:
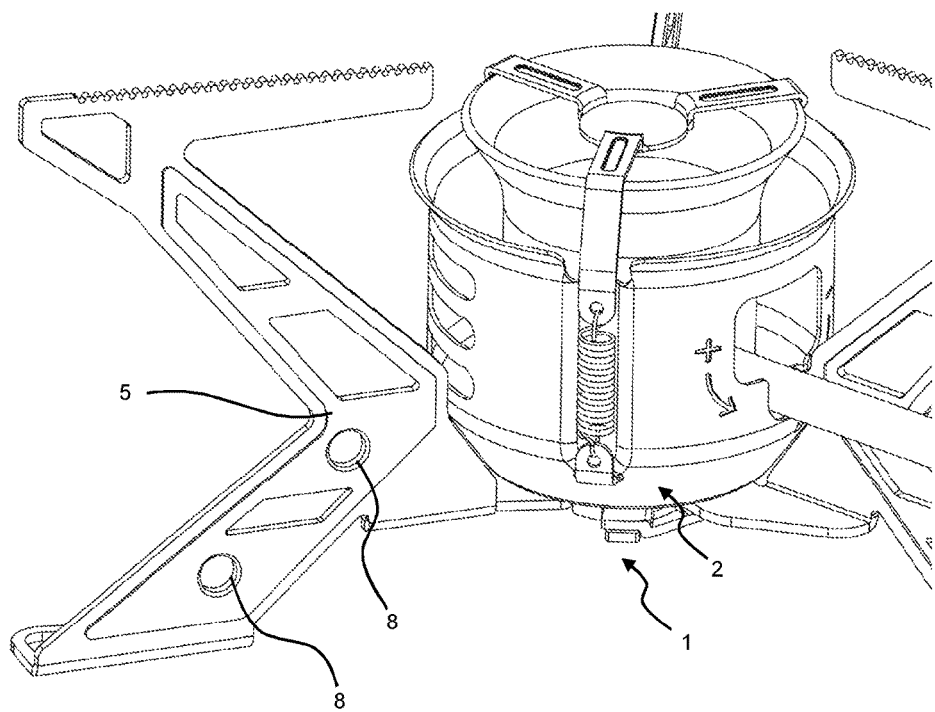
FIG. 5 is a detail view of a leg of the portable stove.
Figure 6:
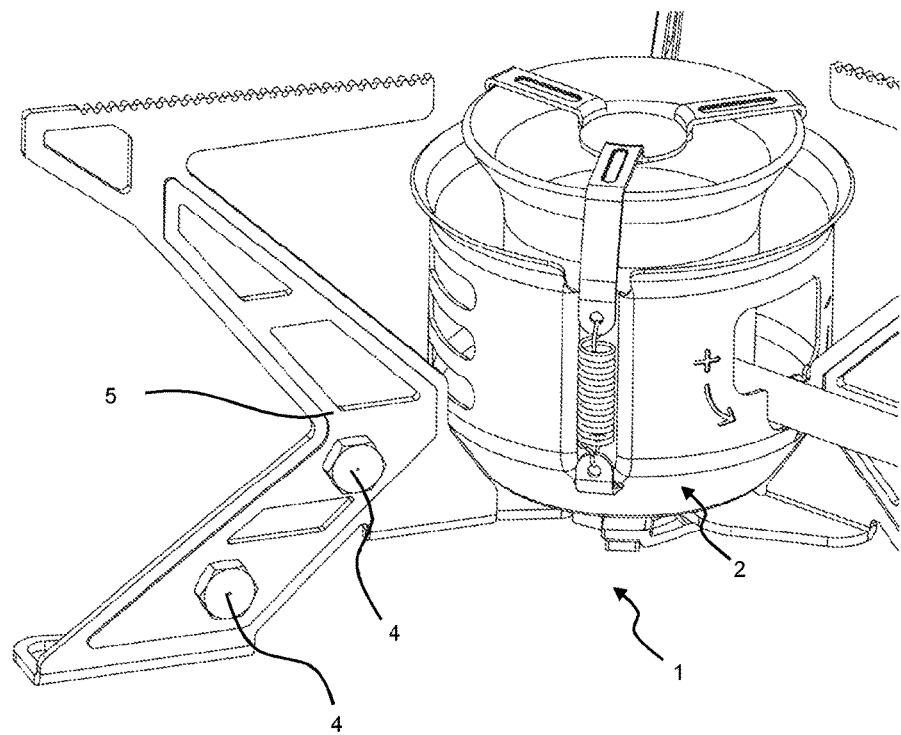
FIG. 6 is a detail view of a leg of the portable stove with mounted jets.
Figure 7:
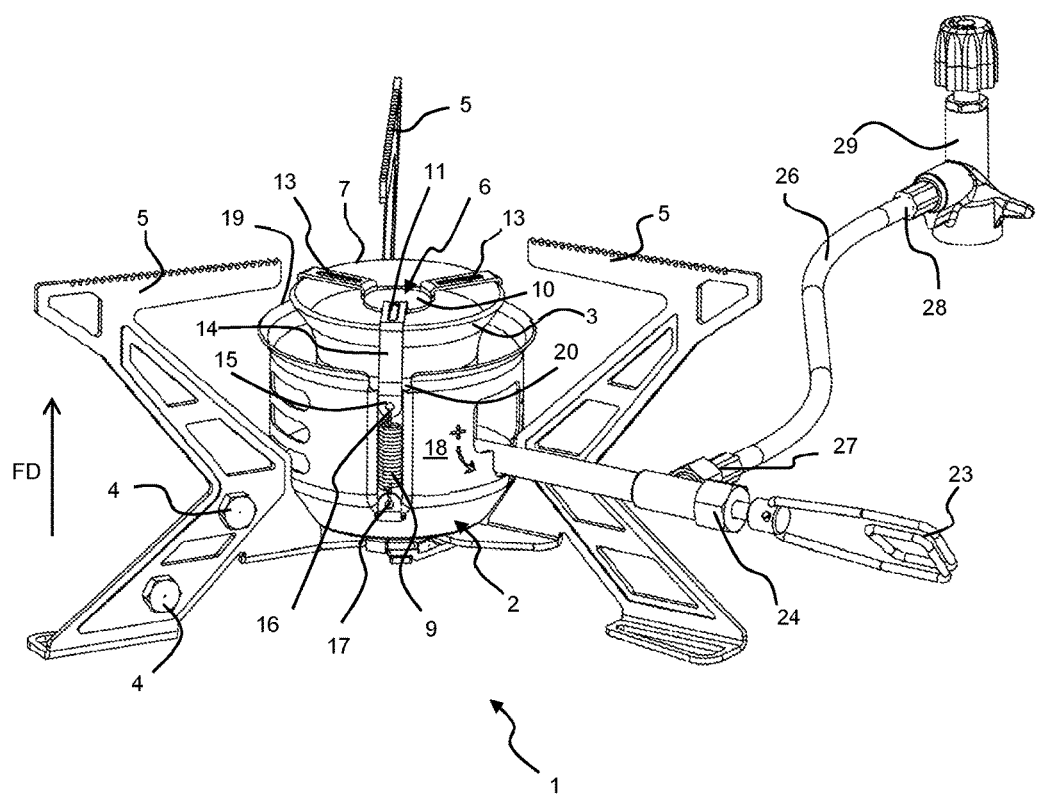
FIG. 7 is a perspective view of the portable stove.
Figure 8:
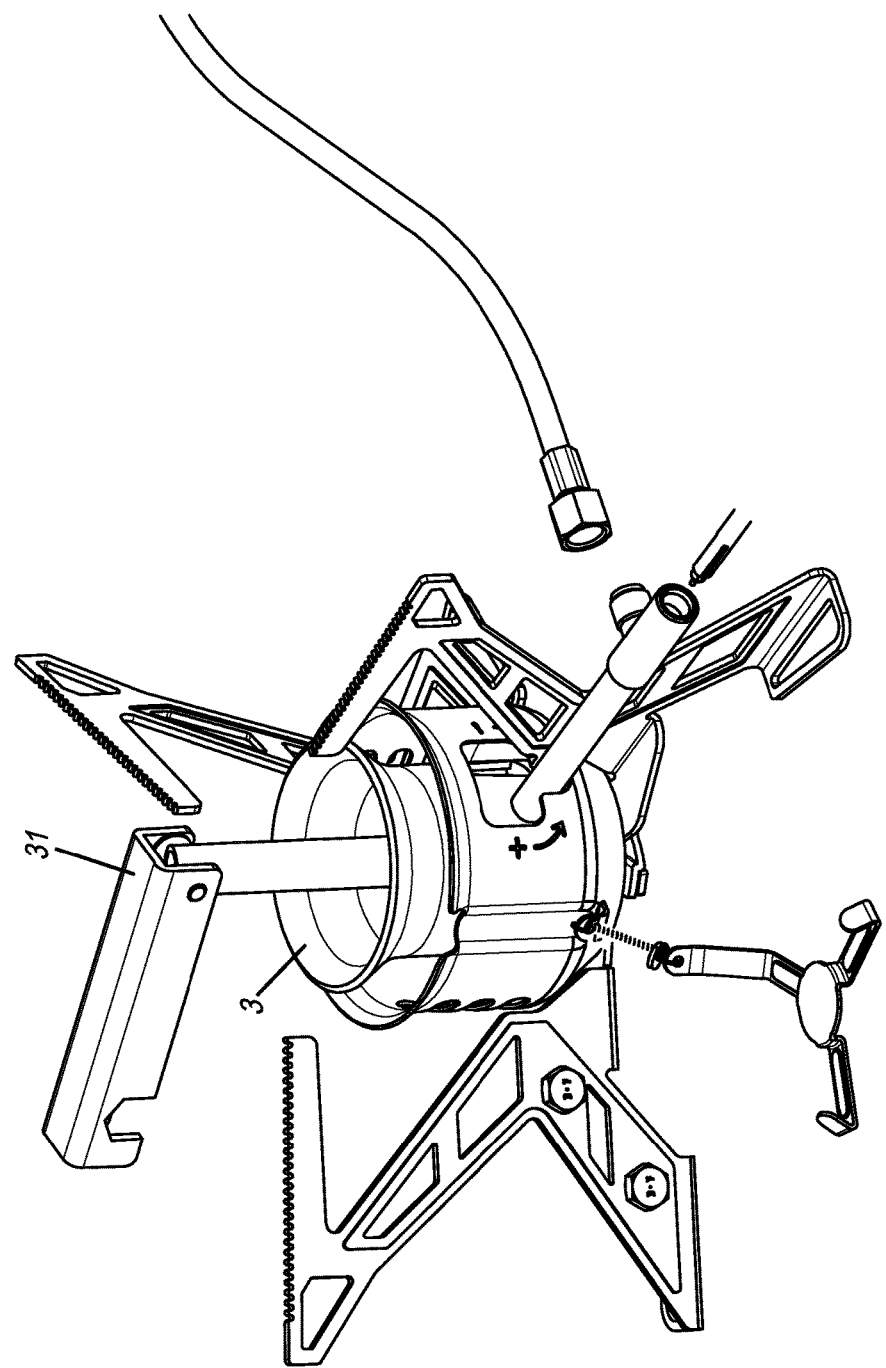
FIG. 8 is a perspective view of the portable stove with a multitool.

As can be seen from FIG. 5 one of the legs 5 of the portable stove 1 comprises two mounting structures 8 in form of openings 8 with inner threads. The jet 4 can be screwed into one of the openings 8 (cf. FIG. 6) such that it is securely fixed to the portable stove 1. In addition, a second jet 4 which is now to be screwed into the burner head 3 can be unscrewed from the leg 5. In general, three jets 4 are provided for the different combustibles used, namely one of the size 0.45 mm for cartridge gas (e.g. propane/butane mixture), one of the size 0.37 mm for white gas and one of the size 0.28 mm for liquid combustibles. As can be seen from FIG. 6, two of the jets 4 are screwed into the respective opening 8 provided at one of the legs 5 of the portable stove 1, wherein one of the jets 4 is screwed to the burner head 3, the latter one being the one in use.

What is claimed is:

1. A portable stove for burning multiple fuels comprising:
   a burner body having a burner head, wherein the burner body includes a wind shield surrounding the burner head, wherein the wind shield has an upper edge and includes a clearance recess defined in the upper edge,
   a first exchangeable jet screwable into the burner head,
   a plurality of legs attached to the burner body, and
   a flame spreader detachably mounted on top of the burner head upstream of the jet in the flame direction, wherein the flame spreader comprises a baffle plate and at least first and second mounting arms extending from the baffle plate, wherein the first mounting arm is attachable to the burner head by a form-fit,
   wherein the flame spreader is attached to the portable stove by an elastic element, such that the flame spreader remains attached to the portable stove by the elastic element when the flame spreader is not mounted on top of the burner head, wherein the second mounting arm of the flame spreader is attached to a first end of the elastic element and the second end of the elastic element is attached to the wind shield, wherein the second mounting arm extends through the clearance recess when the flame spreader is mounted on top of the burner head, and wherein the elastic element provides tension on the flame spreader to hold the flame spreader in place when the flame spreader is mounted on top of the burner head.

2. Portable stove according to claim 1, characterized in that the portable stove comprises at least a second exchangeable jet screwable into the burner head, and the portable stove further comprises at least one mounting structure, wherein the second jet is supported within said mounting structure when not in use and the first jet is screwed into the burner head.

3. Portable stove according to claim 2, characterized in that the mounting structure is disposed on one of said legs.

4. Portable stove according to claim 2, characterized in that the mounting structure is an opening having an inside thread, wherein the second jet is screwed into the opening.

5. Portable stove according to claim 1, characterized in that the elastic element is an elastic tension element.

6. Portable stove according to claim 2, characterized in that one of said jets is suitable for gaseous combustibles and wherein one of said jets is suitable for liquid combustibles.

7. Portable stove according to claim 1, characterized in that the portable stove further comprises a multitool for screwing and unscrewing the jets into the burner head.

8. Portable stove according to claim 1, characterized in that the elastic element is a helical tension spring.

9. Portable stove according to claim 1 wherein the wind shield includes a vertically extending channel defined therein, wherein the clearance recess is positioned at a top of the vertically extending channel, and wherein at least a portion of the elastic element is received in the vertically extending channel when the flame spreader is mounted on top of the burner head.

* * * * *